(12) United States Patent
Osbourne

(10) Patent No.: US 8,479,630 B2
(45) Date of Patent: Jul. 9, 2013

(54) SAW GUIDE

(75) Inventor: Howard George Osbourne, Isle of Man (GB)

(73) Assignee: W S Norman Engineering Limited, British Isles (GB)

( * ) Notice: Subject to any disclaimer, the term of this patent is extended or adjusted under 35 U.S.C. 154(b) by 716 days.

(21) Appl. No.: 12/597,526

(22) PCT Filed: Apr. 28, 2008

(86) PCT No.: PCT/GB2008/050308
§ 371 (c)(1),
(2), (4) Date: May 24, 2010

(87) PCT Pub. No.: WO2008/132515
PCT Pub. Date: Nov. 6, 2008

(65) Prior Publication Data
US 2010/0224046 A1 Sep. 9, 2010

(30) Foreign Application Priority Data

Apr. 27, 2007 (GB) .................................. 0708201.9

(51) Int. Cl.
*B26B 29/06* (2006.01)

(52) U.S. Cl.
USPC .......................................... 83/745; 83/522.15

(58) Field of Classification Search
USPC .. 83/454, 455, 467.1, 468, 469, 468.1–468.4, 83/767, 745, 761, 522.11, 522.15
See application file for complete search history.

(56) References Cited

U.S. PATENT DOCUMENTS

| 11,619 | A | * | 8/1854 | Sibbet | 83/454 |
|---|---|---|---|---|---|
| 952,270 | A | * | 3/1910 | Milk | 83/761 |
| 1,111,904 | A | * | 9/1914 | Kahrs | 83/761 |
| 1,911,045 | A | * | 5/1933 | Tinnen | 83/454 |
| 2,323,319 | A | * | 7/1943 | Finnell | 83/761 |
| 4,325,278 | A | * | 4/1982 | Beerens | 83/745 |
| D274,975 | S | * | 8/1984 | Beerens | D8/71 |
| 4,675,996 | A | * | 6/1987 | DuBuque | 30/2 |
| 4,843,728 | A | * | 7/1989 | Francis | 33/640 |
| 5,182,975 | A | * | 2/1993 | Warner | 83/745 |

(Continued)

FOREIGN PATENT DOCUMENTS

| GB | 2424615 A | 10/2006 |
|---|---|---|
| NL | 1020064 C | 8/2003 |

OTHER PUBLICATIONS

International Search Report; PCT/GB2008/050308; Jul. 31, 2008.

*Primary Examiner* — Sean Michalski
(74) *Attorney, Agent, or Firm* — Myers Bigel Sibley & Sajovec, P.A.

(57) ABSTRACT

A saw guide for guiding the blade of a saw during cutting of a workpiece comprises a housing having a basal surface and a guide surface adapted to be positioned on a workpiece to be cut, such that with the basal surface engaging a surface of the workpiece, the guide surface extends across the surface to be cut at a forward position of the housing, such that a cutting member in face to face contact with the guide surface may be guided during cutting of the workpiece, and measuring means for measuring a position of the guide surface with respect to the workpiece such that, in use, the position of the guide surface may be monitored by reference to said measuring means, during a cutting operation of the workpiece. The saw guide enables a cut to be made with continual reference to the measuring means.

25 Claims, 9 Drawing Sheets

U.S. PATENT DOCUMENTS

| | | | |
|---|---|---|---|
| 5,226,345 A * | 7/1993 | Gamble | 83/745 |
| 5,817,097 A * | 10/1998 | Howard et al. | 606/87 |
| 6,752,059 B1 * | 6/2004 | Posont | 83/745 |
| 7,082,688 B2 * | 8/2006 | Votolato | 30/293 |
| 7,249,552 B2 * | 7/2007 | Hines | 83/761 |
| 7,631,439 B2 * | 12/2009 | Black | 33/759 |
| 7,841,092 B2 * | 11/2010 | Dern | 30/371 |
| 2003/0230180 A1 * | 12/2003 | Hines | 83/162 |
| 2004/0010926 A1 * | 1/2004 | Hampton | 30/374 |
| 2005/0086812 A1 * | 4/2005 | Votolato | 30/293 |
| 2007/0006703 A1 * | 1/2007 | Lin | 83/522.11 |

\* cited by examiner

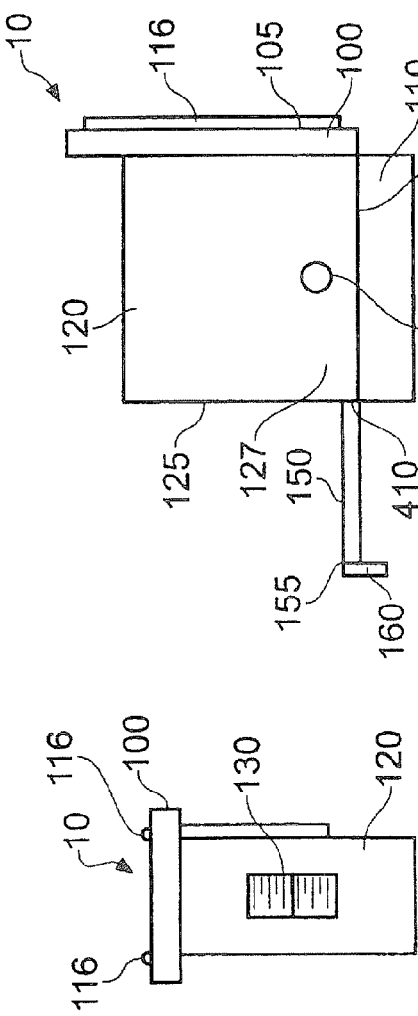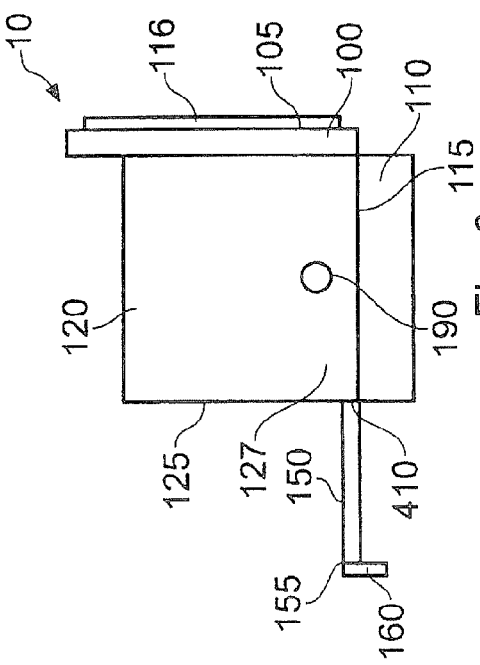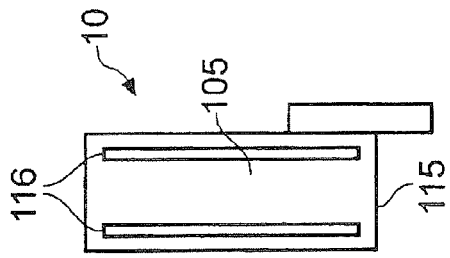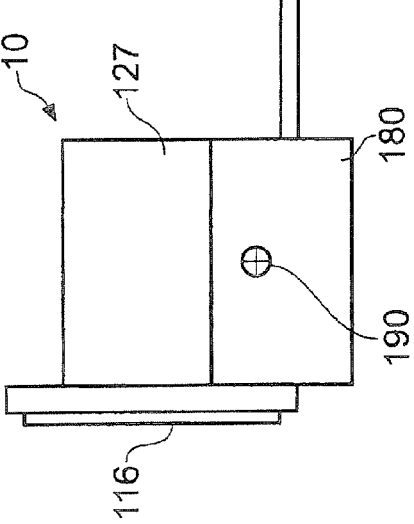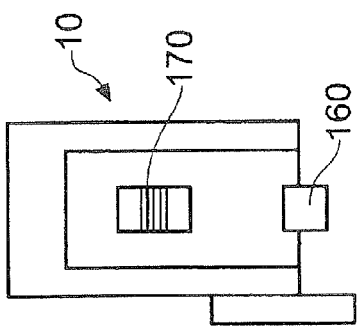

SAW GUIDE

RELATED APPLICATIONS

The present application is a 35 U.S.C. §371 national phase application of PCT International Application No. PCT/GB2008/050308, having an international filing date of Apr. 28, 2008, claiming priority to Great Britain Patent Application No. 0708201.9, filed Apr. 27, 2007. The disclosures of each application are incorporated by reference herein in their entireties. The above PCT International Application was published in the English language and has International Publication No. WO 2008/132515 Al.

This invention relates to guides for use with hand saws for the cutting of materials including timber, plastics materials and metals.

It is known to use a guide to assist the making of a cut through a material in order to cut in a straight line across the width and through the thickness of the material. Non-expert workers often find such cutting operations particularly challenging since they require a high level of coordination of both the angle and position of the blade with respect to the material to be cut, whilst executing a reciprocating action of the blade between first and second positions of the blade.

A simple mitre box may be used as a guide, particularly for cutting wood, the box being adapted to receive the piece to be cut and having guides for the saw in the form of grooves.

US 2003/0230180 (HINES) discloses a guide for use with a cutting member having two angularly related members arranged so that when one member engages the face of a work piece, the other member (a guide member) functions to glidably engage a cutting member such as the blade of a handsaw, the guide member having a magnet which functions continuously to urge the saw into engagement with a plurality of rollers that are also carried by the guide member.

U.S. Pat. No. 4,325,278 (BEERENS) discloses a hand saw guide comprising a member having two right angled related surfaces such that where one surface is in face to face contact with a component to be sawn, the other surface is perpendicular to the component, said other surface having incorporated therein a magnet that holds the blade of a saw against said other surface. The document further discloses a retractable tape measure that may be incorporated in the saw guide, projecting through an aperture in the surface in contact with the blade of the saw.

It is known from PCT/GB2006/001208 in the name of the present applicant to provide a saw guide having a surface with magnetic means for urging a saw blade into engagement with the surface, and a measuring means for measuring the distance of the surface from a predetermined location on a workpiece. However, it has been found that the surface and the saw blade tend to scuff and scratch each other in use. Moreover, it has been found that embodiments of the saw guide disclosed in this prior application can be difficult to hold, and can be inflexible in use, especially on wide workpieces.

According to a first aspect of the present invention, there is provided a saw guide for guiding the travel of a saw blade when cutting a workpiece, the saw guide comprising a housing having a basal surface, and a guide surface provided with magnetic means for urging the saw blade into guiding alignment with the guide surface, and the guide surface further being provided with at least one projection adapted to space the saw blade from the guide surface so as to prevent direct scraping contact by teeth of the saw blade therewith during use, the at least one projection and the guide surface further being sized and shaped such that a scribing mark made on the workpiece with a pencil or the like when braced against the guide surface with the basal surface of the saw guide located on the workpiece corresponds to a line of cut that will be made by the saw blade when the saw blade is in guiding alignment with the guide surface.

In particularly preferred embodiments, the saw guide comprises measuring means adapted to measure a distance of the guide surface from an end of the workpiece located rearwardly of the housing such that the distance may be monitored by reference to the measuring means while the saw blade is guidingly aligned with the guide surface and the saw guide is being held on the workpiece.

The measured distance may be displayed in a display window provided in the housing at a location where it will not normally be obscured by a user's hands or the saw blade when the saw guide is being used.

By carefully configuring the at least one projection, for example by selecting an amount of projection from the guide surface, it is possible to ensure that a scribing line drawn on the workpiece with a pencil having its tip aligned with the guide surface at a junction with the workpiece will accurately represent the exact position of a cut made with the saw blade when guided by the guide surface without moving the saw guide along the workpiece. Alternatively stated, the at least one projection preferably does not project beyond the guide surface more than a pencil-line's width. This allows for accurate positioning of the saw blade. In this way, the saw guide may be used as a scribing tool as well as a guiding tool.

It will be understood that most saw blades have teeth that project a little to either side of the plane of the blade. The at least one projection helps to ensure that the teeth never come into direct contact with the guide surface when the saw blade is in guiding alignment therewith. If the teeth did scrape and damage the guide surface, especially the edge thereof that it used as a scribing guide, then the accuracy of the scribing guide would be compromised. However, the at least one projection should not cause the saw blade to be spaced too far from the guide surface, otherwise the teeth of the saw would not cut along a scribing line made using a pencil against the scribing guide, but would cut at a further distance from the guide surface.

The at least one projection may comprise a pair of ridge members, which may be arranged in a substantially parallel configuration, or in some embodiments a single ridge member having a curved, semicircular, circular, rounded, elliptical or horseshoe shape, or any other shape that will allow the saw blade to be guided in a straight line without pivoting about the at least one projection.

Alternatively, more than two ridge members may be provided, or a single ridge member having a wavy or zigzag configuration.

Alternatively or in addition, two or more button-like projections may be provided.

The projections may have a generally curved or hemispherical/semicircular cross-section. The projections may be made of or coated with a material with a low friction coefficient, for example chromium or PTFE or low-friction plastics or metal materials, including stainless steel or other suitable metals or alloys, optionally coated with a low friction material.

In some embodiments, the projections may comprise roller members, for example made of metal or plastics or metal-coated plastics materials. Where the projections are elongate members, they may be formed as elongate roller members being adapted to rotate about a longitudinal axis of rotation when the saw blade passes back and forth when in contact therewith. Alternatively (or in addition), the projections may be configured as bearing balls or the like, adapted to rotate in suitable spherical bearings or housings.

The projections may have permanent magnetic properties, or may be non-magnetic or not magnetised.

The saw guide has a basal surface for engaging a surface of the workpiece. The basal surface may be flat, or may have a curved cross-section so as to allow the basal surface to fit onto curved workpieces such as lengths of pipe.

The at least one projection is preferably formed on the guide surface so that it does not extend to or is not located on a part of the guide surface that is adjacent to the workpiece when the saw guide is placed thereon. This is because the teeth of the saw blade may otherwise scrape the projections when the saw is tilted back and forth while cutting in a plane parallel to the guide surface. Preferably, the at least one projection does not extend to or is not located on a bottom quarter or bottom third of the guide surface as measured from the basal surface.

Advantageously, the housing includes a handle or hand hold portion that is spaced from the guide surface.

According to a second aspect of the present invention, there is provided a saw guide for guiding the travel of a saw blade, the guide comprising: a closed housing portion having a forward end provided with a guide surface, a basal surface, and a rearward end provided with distance measuring means integral with the housing, the guide being adapted to be positioned on a workpiece to be cut, such that with the basal surface engaging a surface of the workpiece to be cut, the guide surface extends across the surface to be cut so that a saw blade in face to face contact with the guide surface may be guided during cutting of the workpiece without fouling the housing, wherein the measuring means is adapted to measure a distance of the guide surface from an end of the workpiece located rearwardly of the housing such that the distance may be monitored by reference to said measuring means whilst the cutting member is cutting the workpiece and abutting the guide surface, the distance being displayed in a display window provided in the housing, wherein the guide surface comprises a magnetic material to urge the cutting member into contact with the saw guide, and wherein the guide surface is further provided with at least one projection adapted to space the saw blade from the guide surface so as to prevent direct scraping contact by teeth of the saw blade therewith during use.

The at least one projection may be configured as described in connection with the first aspect of the present invention.

Embodiments of the present invention has the advantage over the prior art that the measuring means may be used even when a cut is being made using the saw guide and the saw guide is being held in place on the workpiece with a user's hand.

The guide surface comprises a magnetic material to urge the cutting member into contact with the guide surface. Optionally, the guide surface may further comprise a wear-resistant plate mounted in juxtaposition with the magnetic material, or a wear-resistant coating of the guide surface and/or the projections.

A particular advantage of embodiments of the present invention is that a saw blade, for example a handsaw blade, can be magnetically affixed to the guide surface, and the handsaw held in the right hand (for right-handed users). The left hand is then free to position the housing (specifically the guide surface thereof) at a required cutting position, all the while with reference to the distance displayed in the display window. Cutting can then commence immediately the guide surface is in place. This obviates the need to make pencil marks, and also removes the need to put down and pick up the handsaw between measuring and cutting operations, thus providing greater efficiency when working.

Advantageously, the housing includes a handle or hand hold portion that is spaced from the display window, and preferably also spaced from the guide surface.

According to a third aspect of the present invention, there is provided a saw guide for guiding the travel of a saw blade, the guide comprising: a closed housing portion having a forward end provided with a guide surface, a basal surface, and a rearward end provided with distance measuring means integral with the housing, the guide being adapted to be positioned on a workpiece to be cut, such that with the basal surface engaging a surface of the workpiece to be cut, the guide surface extends across the surface to be cut so that a saw blade in face to face contact with the guide surface may be guided during cutting of the workpiece without fouling the housing, wherein the measuring means is adapted to measure a distance of the guide surface from an end of the workpiece located rearwardly of the housing such that the distance may be monitored by reference to said measuring means whilst the saw blade is cutting the workpiece and abutting the guide surface, the distance being displayed in a display window provided in the housing, wherein the guide surface comprises a magnetic material to urge the cutting member into contact with the saw guide, and wherein the housing is provided with a handle or hand hold portion that is spaced from the display window.

The handle or hand hold portion may be made of a specially coloured and/or textured material so as to be readily distinguishable from other parts of the housing, and/or be ergonomically shaped so as to encourage a user to hold the saw guide at the handle or hand hold portion. In this way, a user is discouraged from holding the saw guide in such a way that his/her hand obscures the display window, and also to keep the hand holding the saw guide away from the guide surface so as to reduce the risk of injury should the saw blade slip during use.

In particularly preferred embodiments, the handle or hand hold portion is recessed from or located below an uppermost part of the housing of the saw guide. By positioning the handle or hand hold portion so that it is relatively close to the workpiece when the saw guide is in use, greater stability is provided than if the handle or hand hold is positioned at a higher point on the housing. This is at least in part due to a low position allowing the fingers of a user to splay onto the workpiece while the palm of the user presses down onto the handle or hand hold portion. In particular, it is preferred that the handle or hand-hold is located at a point below the centre of mass of the saw guide as a whole when the saw guide is in an upright, in use position on the workpiece.

The guide surface in the second aspect of the present invention is advantageously further provided with at least one projection adapted to space the saw blade from the guide surface so as to prevent direct scraping contact by teeth of the saw blade therewith during use, in like manner to the first and second aspects of the present invention.

The measuring means may be a sonic or laser beam measuring device.

Alternatively, the measuring means may be a tape, reversibly extendable from a rearward position of the housing, in a rearward direction away from the guide surface.

Where a tape is used, the housing of the saw guide includes a display window, preferably on a side opposed to the basal surface, which allows the tape to be viewed therethrough, and which is preferably provided with an index mark and optional magnifying means for allowing a reading to be easily taken by a user even then the housing is being held by hand against the workpiece. The distance may, for example, be the distance from a free end of the measuring tape to the guide surface. The position of the saw guide may therefore be continually monitored by reference to the measuring tape when a cut is being made. Thus, any requirement to scribe a line with a pencil or other marking implement in order to define where the cut is to be made is eliminated. Furthermore, the tool can be used to conveniently and rapidly mark a plurality of positions over a surface with respect to the free end of the tape measure. The positions might for example be the positions of holes to be drilled, or the positions where components such as vertical ribbing are to be attached to stud walling etc.

In some applications, the saw guide of embodiments of the present invention may be used as an internal measuring device, for example to measure a width of an alcove, and then transferred directly to a workpiece with the tape locked and extended (or the measured distance otherwise noted/stored in a way that it is easily reproduced when placing the saw guide on the workpiece) so as to allow a length of shelving to be cut without having to make a separate measurement.

The display may comprise a digital display, for example an electronic digital display. Alternatively or in addition, the tape may be graduated to display distance along the length of the tape from the free end. The tape may be graduated such that the distance from the free end to the guide surface may be read by reference to the position of the tape at a convenient reference position.

In a particularly preferred embodiment, a tape is provided which is provided having markings on one side only thereof. The tape is arranged within the housing upon a system of rollers such that the side of the tape bearing the markings is visible through the display window and also visible (in other words, facing away from the workpiece) when extended from the housing. The system of rollers is arranged such that the reading in the display window represents a distance from the free end of the tape to the guide surface. In other words, with the tape fully retracted into the housing, the reading in the display window will not be zero, but will be the distance from the rearward end of the housing to the guide surface. The reading on the tape at the rearward end of the housing will, however, be zero. In this way, it is possible in one step to see both the distance from the free end of the tape to the rearward end of the housing, and also the distance from the free end of the tape to the guide surface.

The system of rollers is advantageously arranged such that the reading in the display window is independent of a diameter of coiled tape within the housing so as to ensure accurate measurement regardless of how much or how little the tape is extended from the housing.

Alternatively, the tape may be provided having markings on both sides thereof, the markings on one side being representative of a distance from the free end of the tape to the rearward end of the housing (visible where the tape extends from the rearward end of the housing), and the markings on the other side being representative of a distance from the free end of the tape to the guide surface (visible through the display window).

The free end of the measuring tape may have means for securing the free end to an edge of a workpiece. The means for securing the free end may be a hook, an angled tip, a loop, or any other suitable arrangement.

Preferably, the housing is adapted such that, when the measuring tape is fully retracted, the means for securing the free end to the edge of workpiece does not stand proud of or project from the basal surface. For example, the means for securing the free end may be received in an aperture or trapdoor arrangement so as to prevent the free end from being irretrievably pulled into the housing, but not projecting from the basal surface. This allows the basal surface to lie flat on the workpiece even when the tape measure is not extended.

Preferably, the measuring tape comprises means for retraction when it is required to retract a length of withdrawn tape. The means for retraction may be spring-loading of the measuring tape, or a manual winding mechanism.

Preferably, the saw guide further comprises means for locking the position of the measuring tape so as to prevent further withdrawal or further retraction of measuring tape.

The ability to secure the free end of the tape measure to a position of the workpiece, and to lock the position of the measuring tape to prevent further withdrawal, enables the person making the cut to apply a pressure to the saw guide so as to place a tension on the tape measure, further enhancing the stability of the position of the saw guide on the surface to be cut.

In some embodiments in which a tape measure is employed the tape is arranged to be reversibly extendible from a spool.

A plurality of tape guide elements may be provided, the tape guide elements being arranged to guide the tape past the display window such that the tape may be viewed through the display window.

Preferably the tape guide elements are provided at locations displaced radially outwardly from the spool.

This arrangement facilitates winding and unwinding of tape onto and from the spool.

The tape guide elements may be arranged along a curved path substantially describing an arc of a circle.

The arc may be substantially centred on an axis of rotation of the spool.

Preferably a portion of the tape that may be viewed through the display window is provided between a pair of the guide elements.

Preferably the tape guide elements are each configured to present a substantially arcuate tape guide element surface to the tape.

Each tape guide element surface may be substantially cylindrical in shape.

Preferably each tape guide element is in the form of a roller member.

Preferably an exit tape guide element is provided, the exit tape guide element having an exit tape guide element surface arranged to guide the tape directly to an aperture provided in a rearward end of the housing.

The exit tape guide element may comprises a roller member provided with the exit tape guide element surface.

Preferably the exit tape guide element surface has a radius of curvature greater than that of the tape guide element surface of the tape guide elements.

The exit tape guide element and tape guide elements may be arranged such that the reading in the display window represents a distance from the free end of the tape to the guide surface. In other words, with the tape fully retracted into the housing, the reading in the display window will not be zero, but will be the distance from the rearward end of the housing to the guide surface. The reading on the tape at the rearward end of the housing will, however, be zero. In this way, it is possible in one step to see both the distance from the free end of the tape to the rearward end of the housing, and also the distance from the free end of the tape to the guide surface.

The exit tape guide element and tape guide elements are advantageously arranged such that the reading in the display window is independent of a diameter of coiled tape within the housing so as to ensure accurate measurement regardless of how much or how little the tape is extended from the housing.

The means for locking the tape in position may comprise means for gripping the tape thereby to prevent further extension or retraction of the tape. The means for gripping the tape may comprise a grip member operable to press the tape against a grip surface. The grip surface may be a portion of the housing or a portion of the exit tape guide element surface. Alternatively the grip surface may be provided by a separate grip surface member.

The grip member may be operable by means of a lever between a locked position in which the grip member presses the tape against the grip surface and an unlocked position in which the tape is not pressed against the grip surface. The grip member may be spring loaded whereby in the first position the grip member is pressed against the grip surface by a spring mechanism. In the second position the grip member may be urged away from the grip surface by the spring mechanism.

Instead of a tape measure, it is envisaged that some variations of the present invention may employ at least one rotary encoder or the like for measuring a distance as the saw guide is moved along a workpiece, with appropriate means for displaying the measured distance.

Preferably, sidewalls of the housing of the saw guide are further provided with one or more guide members. The guide members are advantageously moveable, individually or in various combinations, between a first, retracted position in which they do not project beyond the basal surface, and a second, extended position in which they do project beyond the basal surface, preferably along lateral edges thereof, and provide an abutment surface allowing the saw guide to be braced against an edge of the workpiece, with the basal surface lying flat on the surface of the workpiece to be cut. The guide members may be arranged so as to pivot between the first and second positions, or to reciprocate between the first and second positions, for example by being arranged to be retractable into one or other or both sidewalls of the housing. The guide members may be mounted in a spring-loaded manner and provided with releasable locking means to hold them in one or other or both of the first and second positions.

This has the advantage that the orientation of the saw guide may be more accurately fixed with respect to the workpiece. Moreover, by arranging the guide members such that they can be selectively engaged or moved into position independently on either side of the basal surface, left- and right-handed operation of the saw guide is facilitated, as is use along any edge of a workpiece. By retracting all the guide members, the basal surface can lie flat even when the saw guide is being used in the middle of a wide workpiece.

Preferably the guide members are releasably or moveably mounted on either of a pair of sidewalls of the housing, said pair of sidewalls being mutually substantially parallel, and substantially orthogonal to the basal surface.

In some embodiments, the guide member or members may be arranged so as to project at an adjustable angle relative to the basal surface so as to allow bracing against non-right-angled workpiece edges.

In other embodiments, the guide members may each be pivotable about a central point, and have one end that projects substantially perpendicular to the basal surface, and another end that has a curved or angled configuration. The two ends are selectively operable by pivoting the guide member through ±90° from a horizontal position in which neither end projects from the basal surface. The curved or angled end of the guide members may be shaped so as to allow the saw guide to be positioned on larger curved workpieces (i.e. with a diameter greater than a width of the basal surface), for example large pipes and the like. This feature may be provided in combination with a basal surface having a curved cross-section adapted to accommodate smaller pipes and the like.

The guide surface may be adapted to be pivotable about an axis normal to the basal surface so as to permit cuts at different angles normal to the plane of the surface of the workpiece to be made. Alternately, or in addition, the guide surface may be adapted to be pivotable about an axis in the plane of the basal surface so as to permit cuts at different angles to the plane of the surface of the workpiece. Thus, the tool may be effectively and efficiently used in the cutting of mitre and other joints. The pivoting guide surface is particularly effective in combination with the guide fence.

A protractor may be provided for each axis of pivot in order to measure an angle of the guide surface relative to a reference surface. Preferably, the protractor is disposed so that angular measurements can be displayed in or close to the display window (where provided) for distance measurements. This helps to avoid the protractor from being obscured by the saw blade or a user's hand when the saw guide is in use.

For a better understanding of the present invention and to show how it may be carried into effect, reference shall now be made by way of example to the accompanying drawings, in which:

FIG. 1 is a top view of a preferred embodiment of the saw guide;

FIG. 2 is a front elevation of a preferred embodiment of the saw guide;

FIG. 3 is a left side elevation of a preferred embodiment of the saw guide;

FIG. 4 is a right side elevation of a preferred embodiment of the saw guide;

FIG. 5 is a rear elevation of a preferred embodiment of the saw guide;

Figure 6:
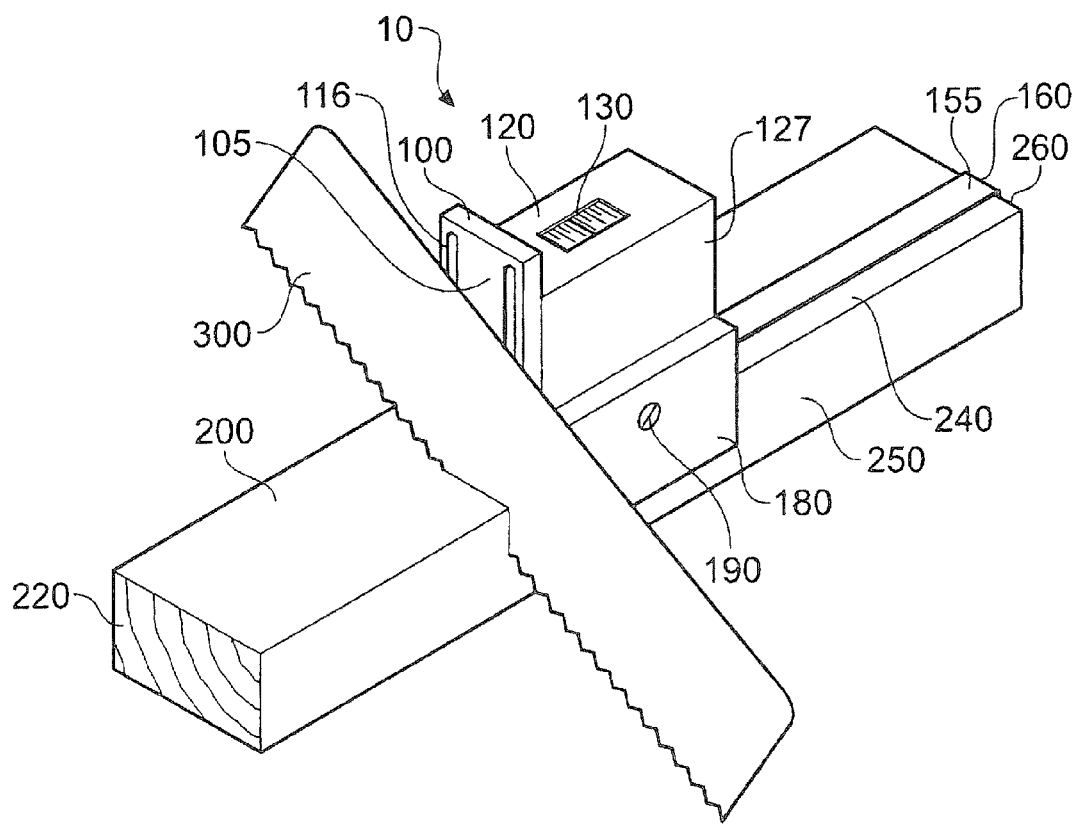
FIG. 6 is a perspective view of a preferred embodiment of the saw guide in use.

According to one embodiment of the invention, the saw guide 10 comprises a guide plate 100 having a guide surface 105 and a base 110 having a basal surface 115 mounted to a housing 120. The guide surface 105 and basal surface 115 are mutually orthogonal and face away from the housing 120. With the basal surface 115 engaging a surface 200 of the workpiece 220 to be cut (FIG. 6), the guide surface 105 extends across the surface to be cut at a forward position of the housing 120, such that a cutting member 300 in face to face contact with the guide surface 105 may be guided during cutting of the workpiece 220.

The housing 120 houses a retractable tape 150 which may be withdrawn from a rear face 125 of the housing 120 in a rearward direction away from the guide plate 100. A free end 155 of the tape 150 is provided with a lip 160 for engaging an edge 260 of a workpiece. The free end provides a datum point with respect to which the position of the guide surface 105, and hence the scribing point, may be determined.

The distance between the free end 155 of the tape 150 and the guide surface 105 of the guide plate 100 may be read from a display 130 on an upper surface of the housing 120, while the distance from the free end 155 of the tape 150 to the rear face 125 can be read directly from the tape 150 at aperture 410.

A button 170 of the housing 120 allows the tape 150 to be locked in a position such that it can be neither withdrawn nor retracted. Release of the button 170 allows a length of tape to be withdrawn by pulling on the tape, or retracted by releasing the button 170. A spring-loading mechanism within the housing 120 of the saw guide 10 causes the tape to automatically retract when the button 170 is released.

The guide plate 100 is magnetised so as to urge a ferromagnetic cutting member 300 into contact with the guide surface 105.

The guide surface 105 further comprises a pair of low-friction projections 116 adapted to provide a gliding surface for the cutting member 300. The projection members 116 in the illustrated embodiment comprise a pair of chromium-plated ridges, but may alternatively comprise a pair of rollers or a plurality of buttons.

The housing 120 of the saw guide 10 further comprises a demountable guide fence 180, which comprises a plate having a substantially uniplanar major surface that may be mounted in juxtaposition with either of a pair of parallel sides 127 of the housing 120. The guide fence is mounted to the housing by means of a screw 190.

In the mounted condition, the guide fence 180 lies in a plane mutually orthogonal to that of the basal surface 115 and the guide surface 105, and projects from the side 127 to which the guide fence 180 is mounted, and beyond the basal surface 115 on the opposite side of the basal surface 115 to the housing 120. The guide fence 180 may be employed for holding the saw guide 10 in position along an edge 240 of a workpiece 200. The guide fence 180 is therefore useful in enhancing the accuracy of cuts which are to be made at right angles to an edge 240 of the workpiece 200. This feature has the further advantage that it provides a substantial increase in the stability of the position of the saw guide 10 along the length of the workpiece 200, since pressure may be applied by the user to urge the guide fence 180 against a side 250 of the workpiece 200, thus increasing the frictional force holding the saw guide 10 in position. The guide fence 180 may be demounted so as to allow the basal surface 115 to lie flat on wide workpieces, or the same result may be achieved by rotating the guide fence 180 through 180° about the screw or bolt 190.

Figure 7:
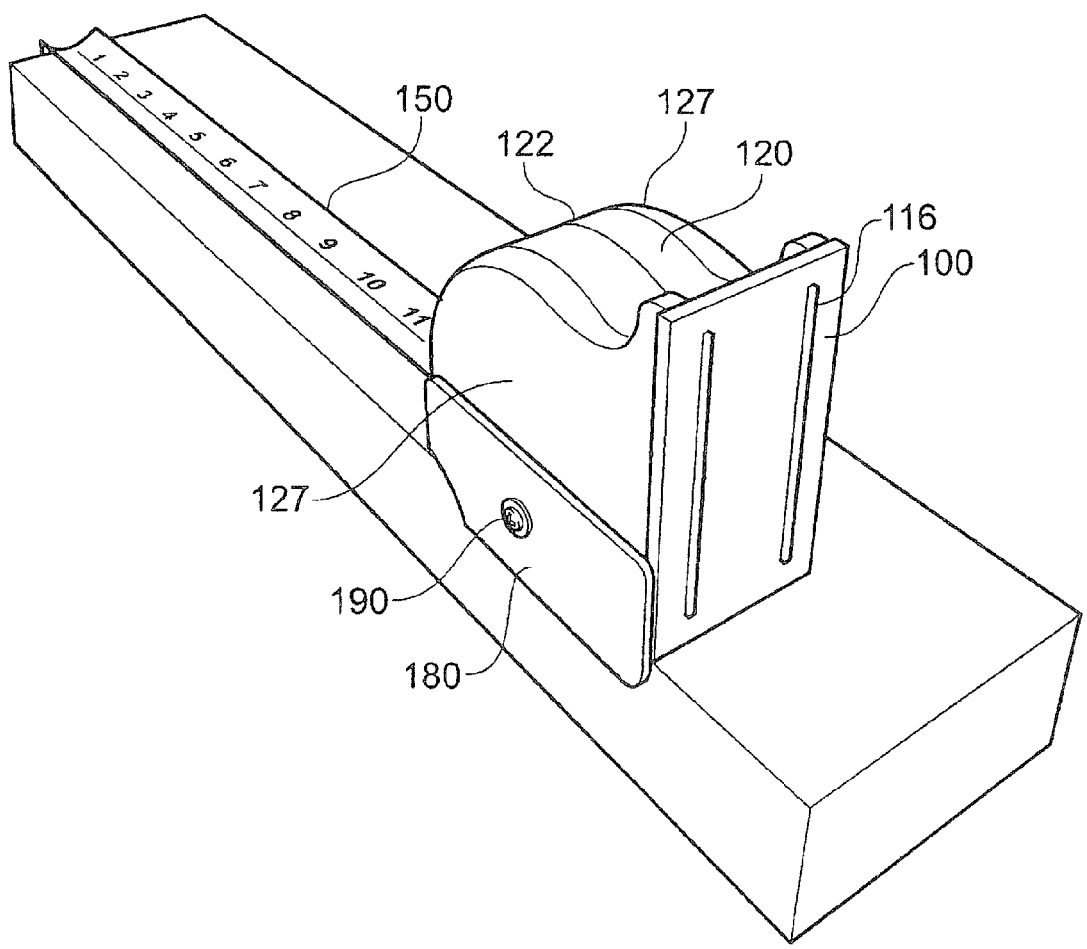
FIG. 7 is a perspective view of a second embodiment of the saw guide.
Figure 8:
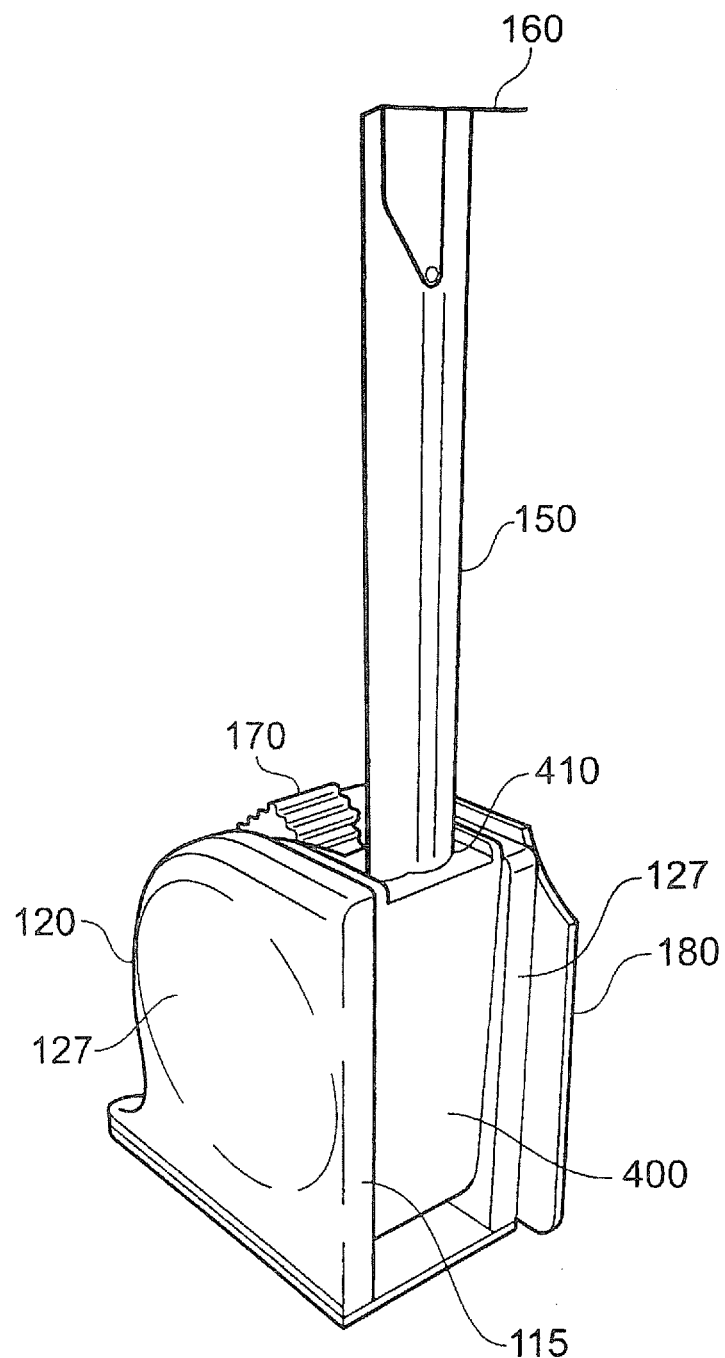
FIG. 8 is a second perspective view of a second embodiment of the saw guide.

In a second embodiment of the invention (FIG. 7, FIG. 8), the position of the guide face 105 with respect to the free end 155 of the tape may be determined by reference to graduated markings of the tape at a convenient reference location, such as an aperture 410 of the housing through which the tape passes. Alternatively, or in addition, the graduated markings at the reference position may display the distance from the free end 150 of the tape to this reference position.

The housing 120 of the second embodiment comprises a moulded housing into which a tape measure 400 is integrally incorporated. The housing comprises two side portions 127 which connect along an edge 122. The basal surface 115 comprises an edge of each side portion 127, and the guide plate 100 comprises a plate of magnetic material fixed to the housing. The distance from the free end 155 of the tape 150 to the guide surface 105 is displayed in the window 130. This is achieved by way of an internal roller mechanism (not shown) inside the housing 120 over which roller mechanism the tape measure 150 is threaded.

Instead of a tape 150, some embodiments (not shown) of the saw guide may incorporate a laser or sonic measuring device in the housing. The laser or sonic measuring device is oriented so as to project a beam in a direction substantially normal to the guide surface and rearwardly away from the guide surface. Thus, cutting of a workpiece can be undertaken with the measuring device in operation, without the cutting operation interfering with the beam.

Figure 9:
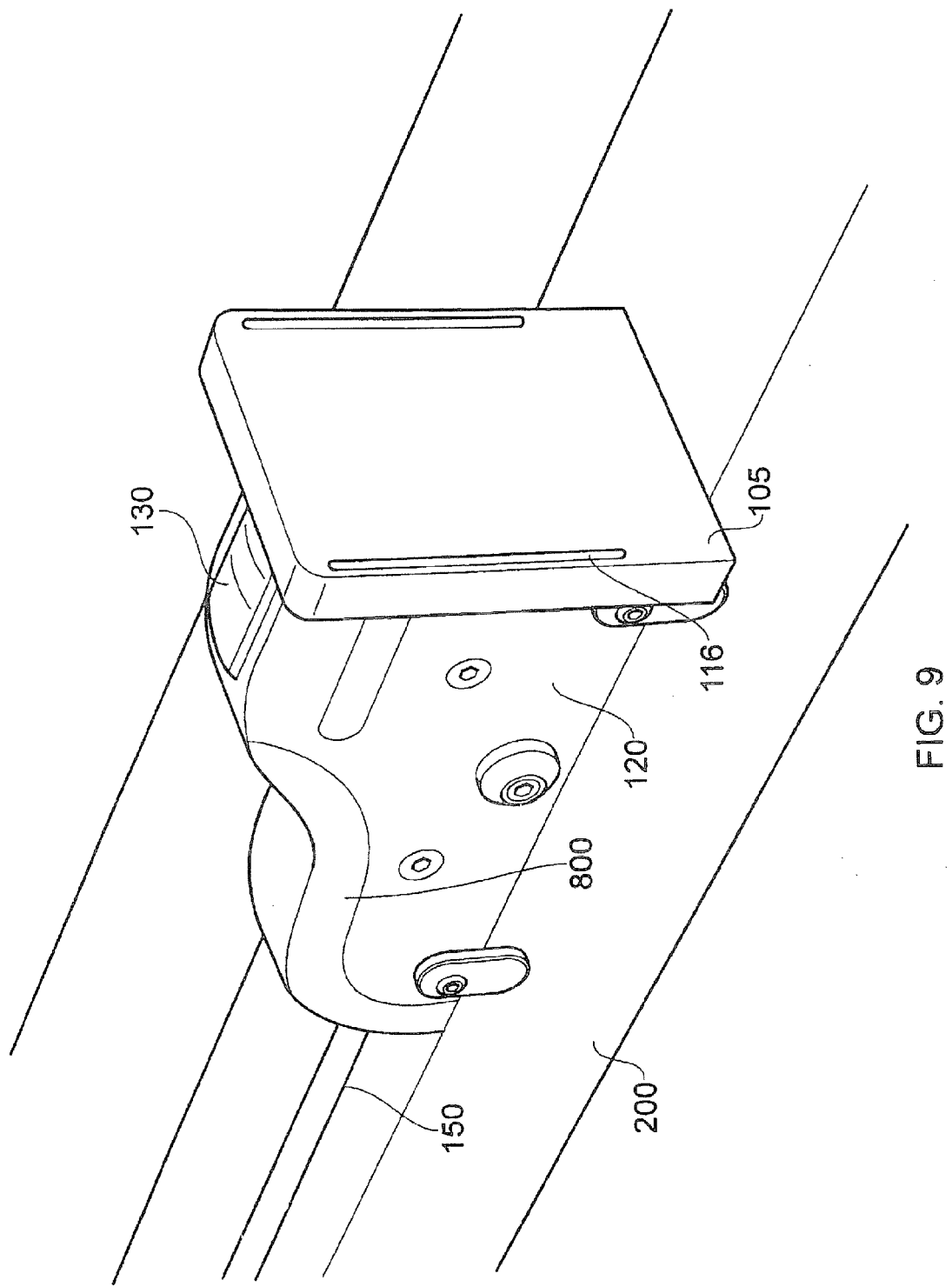
FIG. 9 is a perspective view of a third and particularly preferred embodiment of the saw guide.
Figure 10:
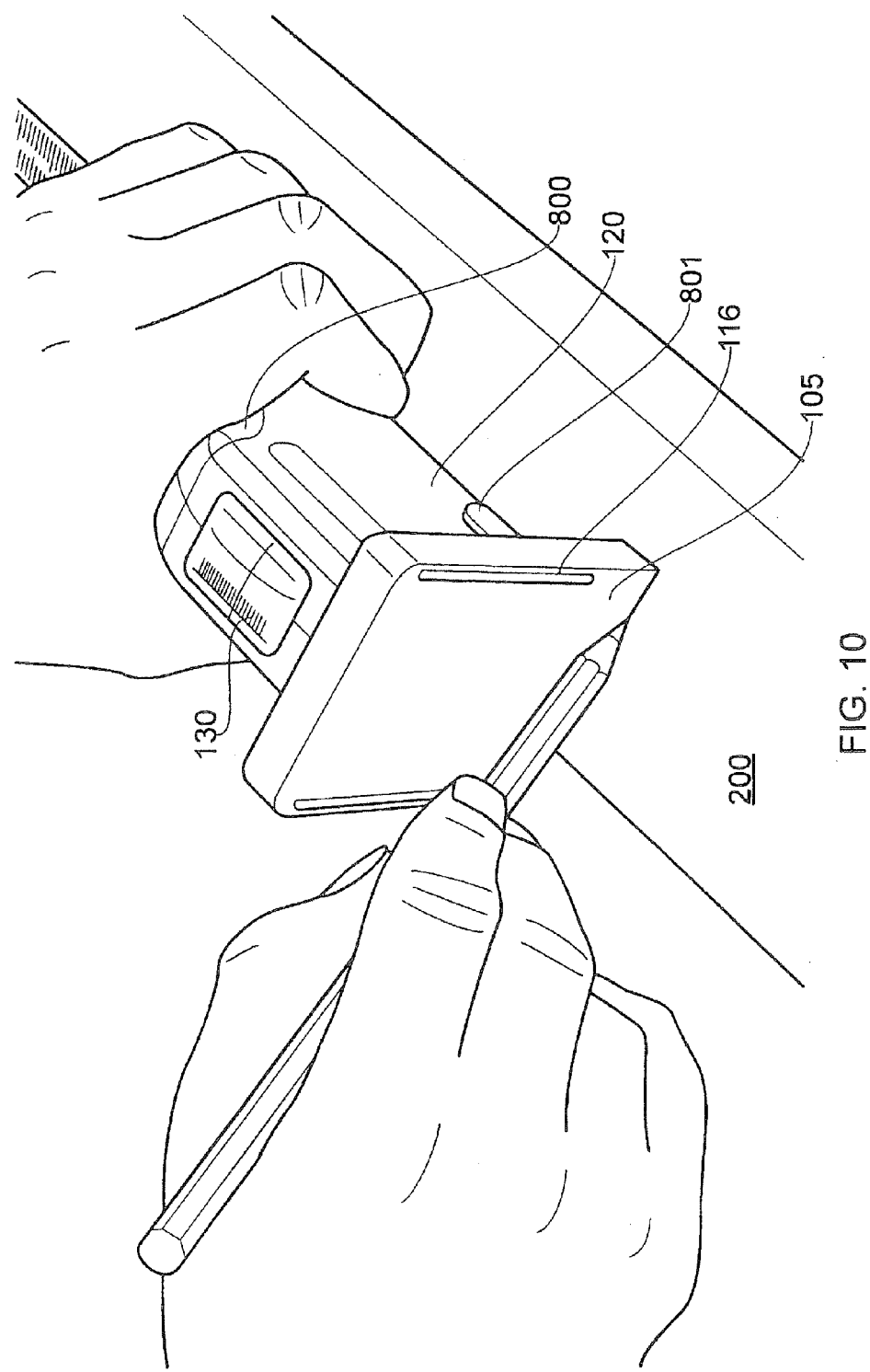
FIG. 10 is a second perspective view of the third embodiment showing how it may be held by a user.

FIGS. 9 and 10 show a third and particularly preferred embodiment of the present invention, with like parts labelled as hereinbefore. A special feature of this embodiment is the provision of a handle or hand hold portion 800, which is made of a differently coloured or textured material than the material of the housing 120. The handle or hand hold portion 180 is positioned away from the guide surface 105 and the display window 130 so as to allow the display window 130 to be clearly visible when the housing 120 is being held in place on the workpiece 200 (best shown in FIG. 10). Another special feature of this embodiment is the provision of four guide members 801, two on either side of the housing 120, which can individually be pivoted between a first position in which they provide an abutment surface that can be engaged against an edge of the workpiece 200 so as to ensure that the guide surface 105 is substantially normal to the edge of the workpiece 200, and a second position in which they do not stand proud of the basal surface 115 and thus allow the basal surface 115 to lie flat on the workpiece 200. FIG. 9 shows two such guide members 801 in the first position on the visible side of the housing 120, with the opposing pair of guide members 801 in the second position on the other side of the housing 120 (as shown in FIG. 10). In this way, the saw guide may be used both left-handed and right-handed, and along any edge of the workpiece 200. Moreover, by moving all the guide members 801 into the second position, the saw guide may be placed on the middle of a wide workpiece 200 and not just at the edges thereof.

It is to be understood that in some embodiments only one guide member 801 may be provided on one or both sides of the housing 120. In some embodiments more than two guide members 801 are provided on one or both sides of the housing 120.

Figure 11:
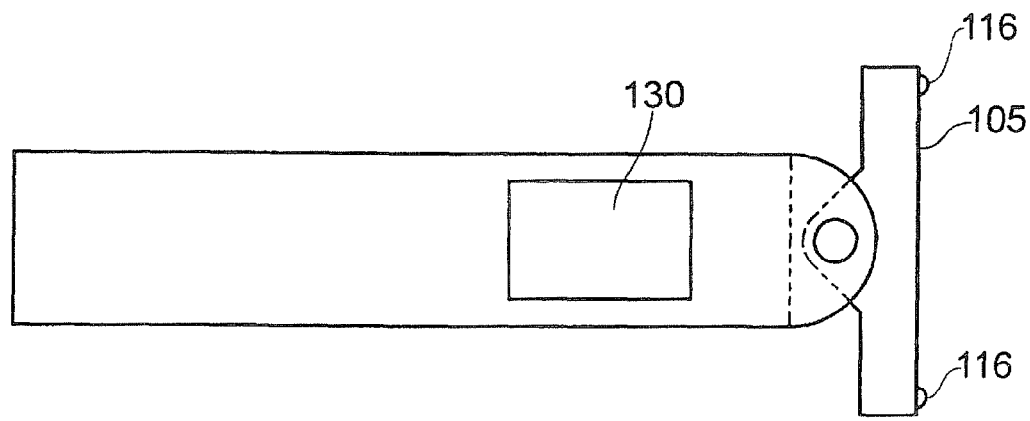
FIG. 11 is a plan view of a fourth embodiment of the saw guide.
Figure 12:
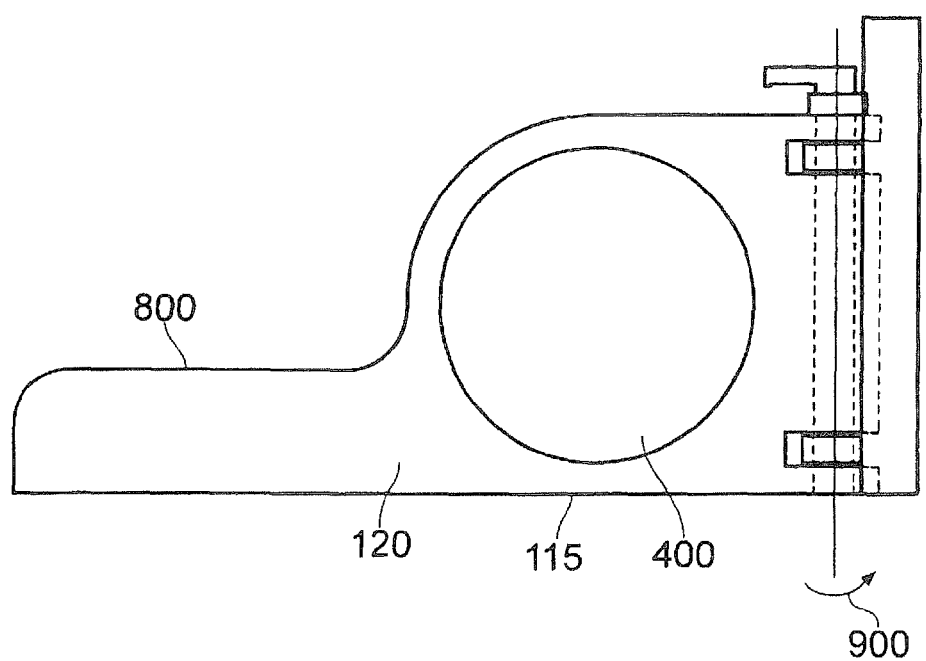
FIG. 12 is a side elevation of the fourth embodiment of the saw guide.

FIGS. 11 and 12 show a fourth variation, with like parts being labelled as hereinbefore. In this variation, the guide surface 105 is pivotable about an axis 900 substantially normal to the basal surface 115. The guide surface 105 may form part of a unit 901 with mounting means 902 adapted to fit onto a pivot 902. Preferably, detents or other means are provided so as to allow the unit 901 to ratchet or lock at predetermined angles, for example 4° to the illustrated orientation, or at 15° intervals between the illustrated position up to 90° to the illustrated position. A cam lock lever 903 or other appropriate mechanism may be provided so as to lock the unit 901 at the required angle. Indicia may be provided to show the selected angle.

The saw guide may further include an angular reading protractor. Thus the angle of the guide surface 105 with respect to the guide fence may be set by reference to the protractor.

Alternatively or in addition, the guide surface 105 may be pivotable about an axis parallel to the basal surface 115.

Figure 13:
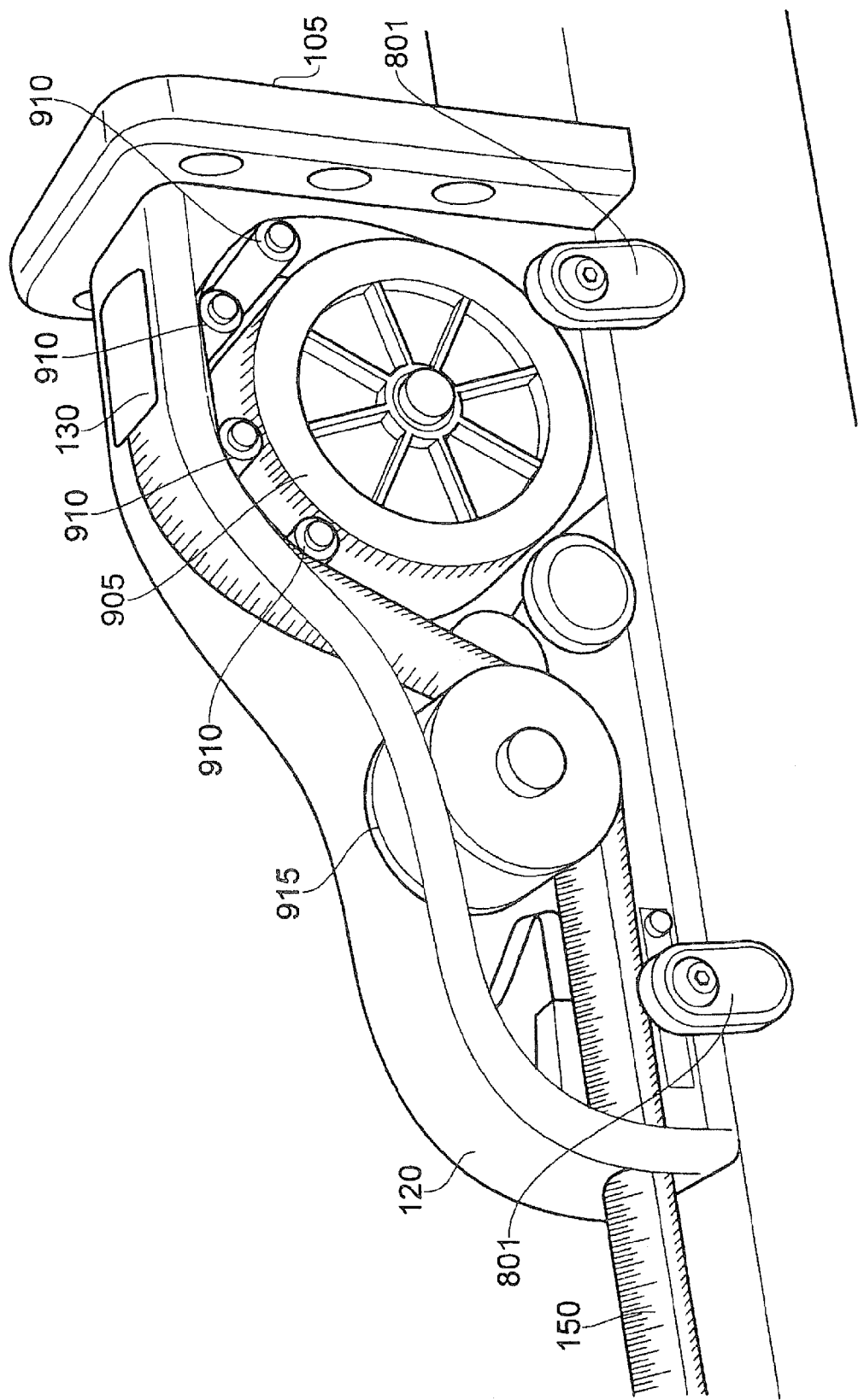
FIG. 13 shows a saw guide according to an embodiment of the invention having a transparent housing.

FIG. 13 shows an embodiment similar to the variation of FIGS. 11 and 12 having a housing formed from a transparent plastics material. An internal roller mechanism is visible, allowing an arrangement of the retractable tape 150 within the housing 120 to be seen.

The tape 150 is arranged to be stored on a spool 905 that has a spring-loading mechanism therein arranged to cause the tape to automatically retract when a free end 155 of the tape 150 is released following extension of the tape.

A series of four roller elements 910 are provided arranged to rotate about axes positioned around a radially outer edge of the spool 905. The roller elements 910 are arranged to guide tape 150 withdrawn from the spool past the display 130 on an upper surface of the housing 120. The tape is subsequently passed around a portion of a primary tape guide element 915 before exiting the housing 120 through an aperture 410 provided in a rear portion of the housing 120. The primary tape guide element 915 has a diameter larger than that of the roller elements 910. In some embodiments the primary tape guide element 915 has a diameter at least twice that of the roller elements 910.

Figure 14:
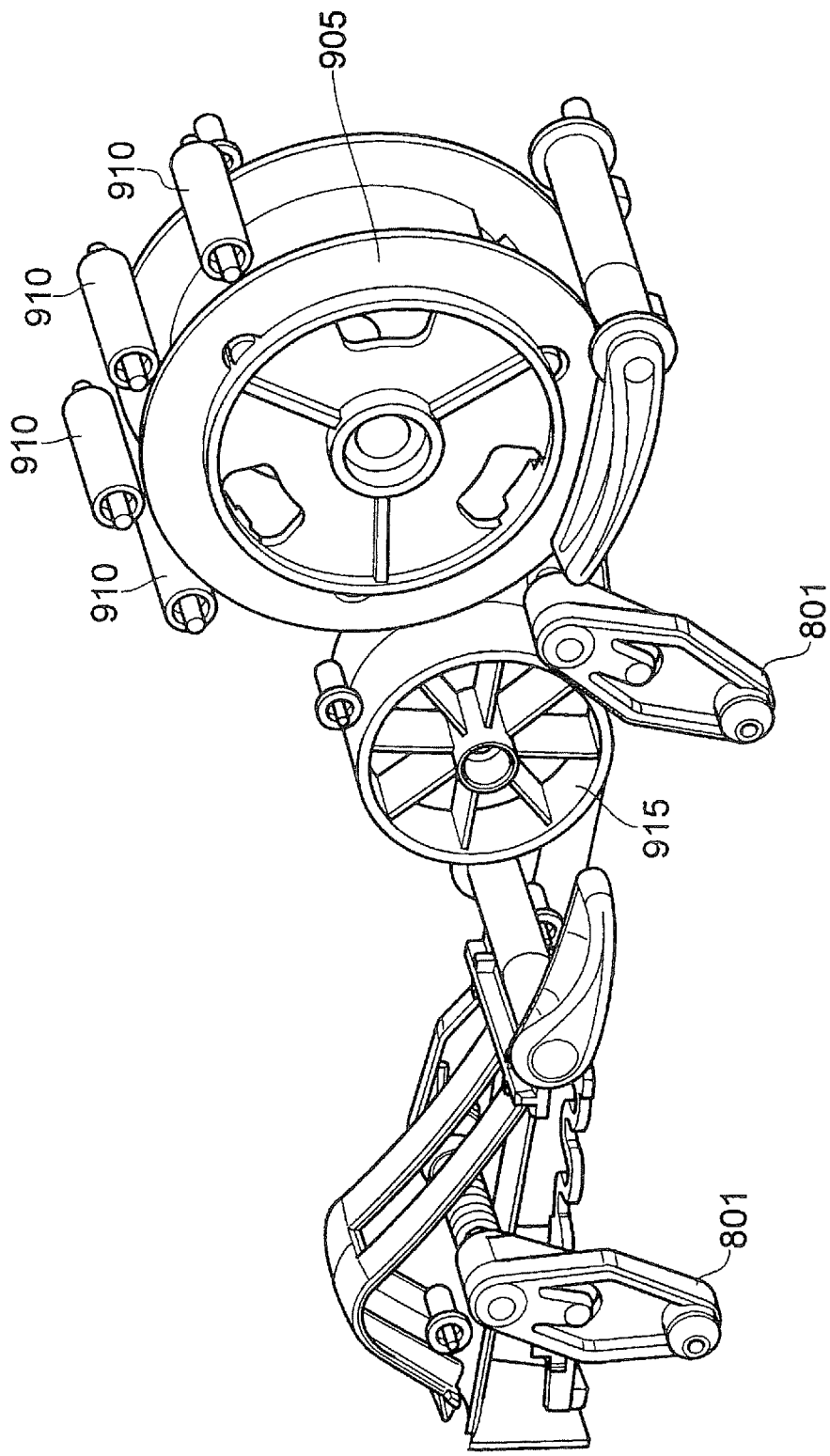
FIG. 14 is a schematic illustration of a portion of an internal mechanism of a saw guide according to an embodiment of the invention.

FIG. 14 is shows the roller mechanism and guide members 801. As discussed above the guide members 801 are each independently operable to pivot between a first position in which they provide an abutment surface that can be engaged against an edge of the workpiece 200 so as to ensure that the guide surface 105 is substantially normal to the edge of the workpiece 200, and a second position in which they do not stand proud of the basal surface 115 and thus allow the basal surface 115 to lie flat on the workpiece 200.

In the embodiment of FIG. 13 and FIG. 14 the roller elements 910 and primary tape guide element 915 are arranged such that the reading in the display window represents a distance from the free end of the tape to the guide surface. In other words, with the tape fully retracted into the housing, the reading in the display window will not be zero, but will be the distance from the rearward end of the housing to the guide surface. The reading on the tape at the rearward end of the housing will, however, be zero. In this way, it is possible in one step to see both the distance from the free end of the tape to the rearward end of the housing, and also the distance from the free end of the tape to the guide surface.

The roller elements 910 and primary guide member 915 are also arranged such that the reading in the display window is independent of a diameter of coiled tape on the spool 905 so as to ensure accurate measurement regardless of how much or how little the tape is extended from the housing.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

The invention claimed is:

1. A saw guide for guiding the travel of a saw blade when cutting a workpiece, the saw guide comprising:
    a housing having a basal surface, and a guide surface provided with magnetic means for urging the saw blade into guiding alignment with the guide surface, the guide surface further comprising at least one projection adapted to space the saw blade from the guide surface so as to prevent direct scraping contact by teeth of the saw blade therewith during use, the at least one projection and the guide surface further being sized and shaped such that a scribing mark made on the workpiece with a pencil or the like when braced against the guide surface with the basal surface of the saw guide located on the workpiece corresponds to a line of cut that will be made by the saw blade when the saw blade is in guiding alignment with the guide surface, and;
    a plurality of retractable guide members, at least one on each side of the housing, arranged so as to be moveable between a first, retracted position in which they do not project beyond the basal surface, and a second, extended position in which they do project beyond the basal surface.

2. A saw guide as claimed in claim 1, wherein the guide members are pivotally mounted on the housing.

3. A saw guide as claimed in claim 1, wherein the guide members are reciprocally receivable within a portion of the housing.

4. A saw guide as claimed in claim 1, wherein the plurality of guide members are individually and independently moveable between the first and second positions.

5. A saw guide as claimed in claim 1, wherein at least some of the plurality of guide members are linked so as to be moveable together in unison between the first and second positions.

6. A saw guide as claimed in claim 1, wherein at least one guide member has first and second ends and is pivoted between the first and second ends so that each end is selectively moveable into the extended position, the first end being configured so as to be generally perpendicular to the basal surface when in the extended position, and the second end having a curved or angled configuration shaped so as to allow the guide member to follow a surface of a curved workpiece when in the extended position.

7. A saw guide as claimed in claim 1, wherein the basal surface has a curved or arcuate cross section or includes a groove so as to be able to receive a curved workpiece.

8. A saw guide as claimed in claim 1, wherein the guide surface is pivotable.

9. A saw guide as claimed in claim 1, wherein the guide surface is pivotable between preset angular positions at each of which the guide surface may be releasably locked.

10. A saw guide as claimed in claim 1, further comprising:
    protractor means for displaying an angle of pivot of the guide surface.

11. A saw guide as claimed in claim 10, wherein the protractor means is arranged so as to display the angle of pivot on an upper part of the housing remote from the basal surface.

12. A saw guide as claimed in claim 1, further comprising:
    measuring means adapted to measure a distance of the guide surface from an end of the workpiece located rearwardly of the housing such that the distance may be monitored by reference to the measuring means while the saw blade is guidingly aligned with the guide surface and the saw guide is being held on the workpiece.

13. A saw guide as claimed in claim 12, further comprising:
    a display window provided in the housing at a location so as not to be obscured by a user's hands or the saw blade when the saw guide is being used, wherein the measured distance is displayed in the display window.

14. A saw guide as claimed in claim 13, wherein the measuring means is a tape, reversibly extendable from the rearward end of the housing, in a rearward direction away from the guide surface.

15. A saw guide as claimed in claim 14, wherein a plurality of tape guide elements are provided arranged to guide the tape past the display window such that the tape may be viewed through the display window.

16. A saw guide as claimed in claim 15, wherein the tape guide elements are provided at locations displaced radially outwardly from the spool.

17. A saw guide as claimed in claim 15, wherein the tape guide elements are arranged along a curved path substantially describing an arc of a circle.

18. A saw guide as claimed in claim 15, wherein the tape guide elements are arranged such that a reading in the display window represents a distance from a free end of the tape to the guide surface.

19. A saw guide as claimed in claims 15, wherein the tape guide elements are arranged whereby a reading in the display window is independent of a diameter of coiled tape on the spool.

20. A saw guide as claimed in claim 1, wherein the at least one projection comprises at least a pair of ridge members.

21. A saw guide as claimed in claim 20, wherein the ridge members are arranged in a substantially parallel configuration.

22. A saw guide as claimed in claim 1, wherein the at least one projection comprises roller members.

23. A saw guide as claimed in claim 22, wherein the roller members are elongate and are adapted to rotate about a longitudinal axis of rotation when the saw blade passes back and forth when in contact therewith.

24. A saw guide as claimed in claim 22, wherein the roller members comprise bearing balls adapted to rotate in spherical bearings when the saw blade passes back and forth when in contact therewith.

25. A saw guide as claimed in claim 1, wherein the at least one projection has permanent magnetic properties.

* * * * *